United States Patent
Gardner et al.

(10) Patent No.: US 7,610,879 B2
(45) Date of Patent: Nov. 3, 2009

(54) WIRELESS IDENTITY TRACING SYSTEM FOR TRACING ANIMALS AND FOOD PRODUCTS

(76) Inventors: Sarah Margaret Gardner, 30 Bolton Road, Windsor, Berkshire (GB) SL4 3JN; Natividade Albert Lobo, 30 Bolton Road, Windsor, Berkshire (GB) SL4 3JN ( * ) Notice: Subject to any disclaimer, the term of this patent is extended or adjusted under 35 U.S.C. 154(b) by 647 days.

(21) Appl. No.: 10/522,637

(22) PCT Filed: Jul. 28, 2003

(86) PCT No.: PCT/GB03/03305

§ 371 (c)(1),
(2), (4) Date: Jan. 23, 2006

(87) PCT Pub. No.: WO2004/010774

PCT Pub. Date: Feb. 5, 2004

(65) Prior Publication Data

US 2006/0125627 A1     Jun. 15, 2006

(30) Foreign Application Priority Data

Jul. 26, 2002   (GB)   ................................. 0217393.8

(51) Int. Cl.
*A01K 29/00*   (2006.01)
(52) U.S. Cl. ..................... 119/720; 340/573.3
(58) Field of Classification Search ................. 119/720, 119/718, 719, 721, 174; 340/573.3, 573.4
See application file for complete search history.

(56) References Cited

U.S. PATENT DOCUMENTS

| 5,322,034 | A  |   | 6/1994  | Willham et al.              |
|-----------|----|---|---------|-----------------------------|
| 5,844,489 | A  | * | 12/1998 | Yarnall et al. ..... 340/573.3 |
| 5,857,434 | A  |   | 1/1999  | Anderson                    |
| 5,959,526 | A  | * | 9/1999  | Tucker ............. 340/572.1 |
| 6,329,920 | B1 | * | 12/2001 | Morrison et al. ... 340/573.3 |
| 6,346,885 | B1 |   | 2/2002  | Curkendall                  |
| 6,894,600 | B2 | * | 5/2005  | Phelan ............. 340/10.34 |
| 7,059,275 | B2 | * | 6/2006  | Laitinen et al. ...... 119/720 |
| 7,234,421 | B2 | * | 6/2007  | Natividade et al. .... 119/720 |
| 7,317,969 | B2 | * | 1/2008  | Lorton et al. ........ 700/275 |
| 7,446,647 | B2 | * | 11/2008 | Helgeson ........... 340/10.1  |

FOREIGN PATENT DOCUMENTS

| WO | WO 98/47351   | 10/1998 |
|----|---------------|---------|
| WO | WO 02/076193 A1 | 10/2002 |

\* cited by examiner

*Primary Examiner*—Yvonne R. Abbott
(74) *Attorney, Agent, or Firm*—Reinhart Boerner Van Deuren s.c.

(57) ABSTRACT

An animal electronic data collecting device is disclosed which includes a radio transmitter and a radio receiver, a processor for controlling operation of the device, and memory for storing information including a first identifier associated with the device. The processor is arranged to transmit a signal, using the radio transmitter, and to receive, using the radio receiver, one or more signals, each representing a second identifier from other devices, and the processor is arranged to store in the memory each second identifier. The default operating condition of the device is for the radio receiver to be in a receive condition and, upon receipt of a wakeup call, the processor is arranged to place the radio transmitter into a transmit condition.

17 Claims, 4 Drawing Sheets

WIRELESS IDENTITY TRACING SYSTEM FOR TRACING ANIMALS AND FOOD PRODUCTS

BACKGROUND OF THE INVENTION

Field of the Invention

The present invention relates to the tracking and tracing of contacts between animals or between food products or between animals and food products for the purpose of monitoring the transmission of disease.

Disease can spread through contact between animals or through contamination of food arising from contact between food and animal products. It would be useful to maintain a record of the contacts that an individual animal makes with other individuals of the same and/or different species. Similarly, it would be useful to record the contacts between different food products, which may indicate possible sources of contamination between them.

In the wild, animals may come into contact with each other at points such as feeding or drinking areas, courtship territories or breeding grounds, and migration routes. The contacts may be between animals of the same or different species including domestic livestock. Contacts between domestic and wild animals may be important in the spread of animal diseases such as the possible transmission of tuberculosis between badgers and cows. In the absence of direct observation or video recording, evidence of actual contact between the different species is difficult to obtain.

In modern livestock farming, animals can be moved between several different locations during their lifetimes. For example, breeding stock are normally reared on specialist livestock farms and then transferred to other farms to complete their productive lives. This transfer usually involves an auction market and at least one livestock dealer and two or more haulage contractors. At the end of their productive lives, the animal may pass through a cull stock market before being transferred to an abattoir or renderer. A similar or greater number of transfers may be recorded for animals reared for prime meat.

In the food industry, food products may pass through several locations before reaching their final point of sale. For example, the production of a joint of meat for sale in a supermarket will usually involve an abattoir, a butchering venue, a wrapping plant, a distribution outlet, and a transport vehicle. At some or all of these venues, the joint may come into contact with joints or products from other animal carcasses and/or other food products.

International Patent Application Publication Number WO02/076193 discloses an animal tracking system in which a data gathering device comprises a radio transmitter and receiver. A processor is arranged to transmit a signal including a unique identifier identifying the data gathering device and to receive signals from other devices each of which includes a further unique identifier identifying the other data gathering device. In the data gathering device described, the device periodically transmits an inquiry signal and then enters a wait state in which the receiver is turned on and the device waits to receive any responses to the transmitted inquiry signal.

DESCRIPTION OF THE DRAWINGS

An electronic data collecting device and method will now be described further, by way of example only, with reference to the accompanying drawings, in which.

DETAILED DESCRIPTION OF THE PREFERRED EMBODIMENT

In the livestock environment, it is envisaged that electronic data collection devices are associated with agricultural livestock and also with premises and transport vehicles involved in the business of agriculture, e.g. livestock markets, abattoirs, transport vehicles, farm buildings, etc.

Although the device is described in greater detail with reference to the livestock environment, the device is equally applicable to other environments. By way of example only, such devices may also be associated with other domestic or wild animal species or with features used by these species in feeding, reproduction, courtship, migration or dispersal such as feed troughs, trees, fences, marking posts, fish ladders, and other similar items.

Figure 1:
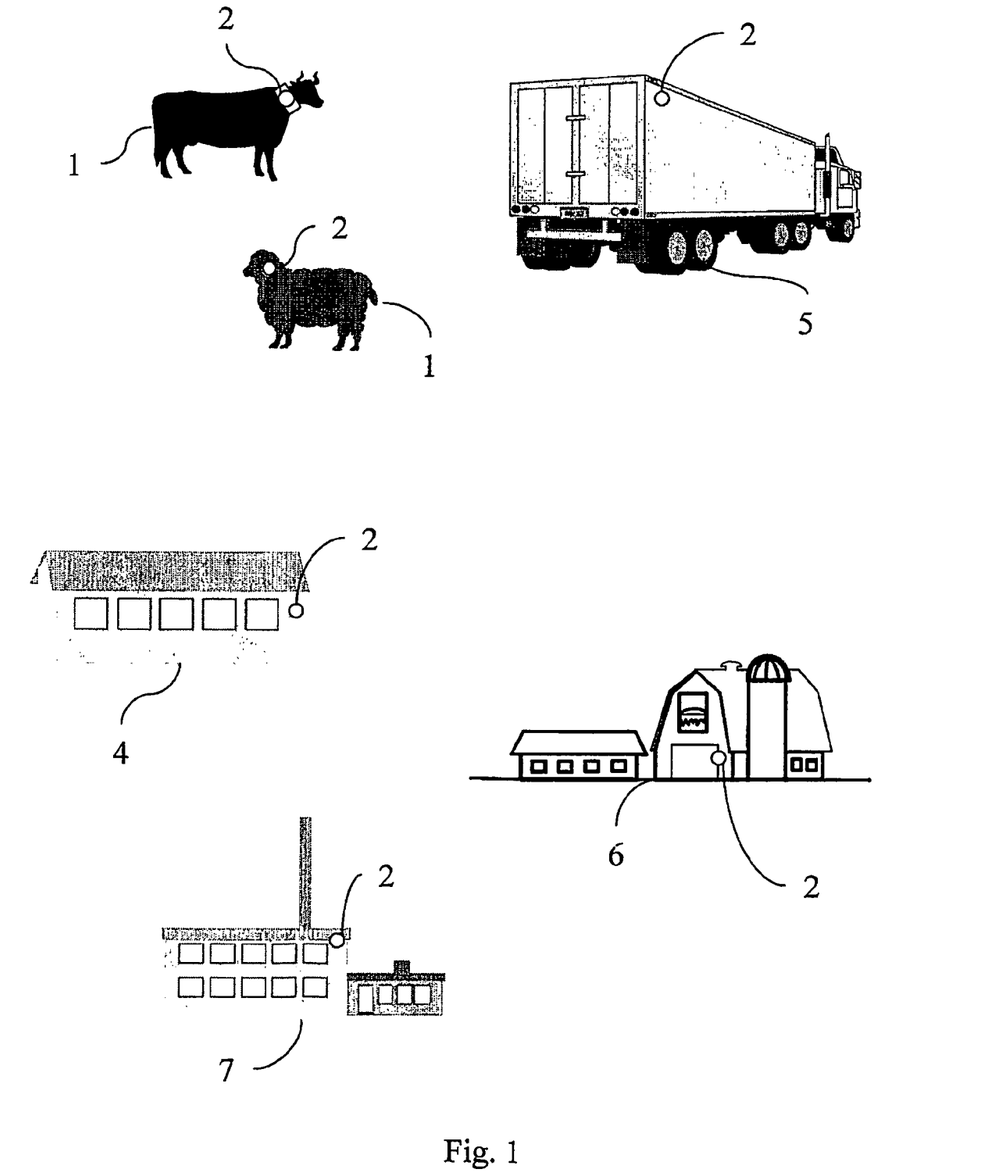
FIG. 1 illustrates an example of an animal movement system.

FIG. 1 shows an example of such a system. Each agricultural animal 1 has a Animal Product electronic data collecting device 2 associated with it in some way. To prevent fraud or error, it is advisable for the device to be tamper-proof and also extremely difficult to remove from the animal. The device may be formed as an ear tag, collar, implant, or bolus. As mentioned above, it is intended that facility electronic data collection devices are also provided at agricultural premises or on transport vehicles. For instance, a facility device 2 may be provided at each entrance to a livestock market 4. This device forms a record of all devices that have come into radio contact with it and hence all animals or locations with which those devices are associated. Similarly, a device 2 may be provided on an agricultural transport vehicle 5 (e.g. near the ramp of a truck) or farm building 6 to record all devices that have come into radio contact with the device on the truck 5 or farm 6. An abattoir 7 may also be provided with one or more facility devices 2 to maintain a record of all devices that have come into radio contact with the devices at the abattoir 7.

Figure 2:
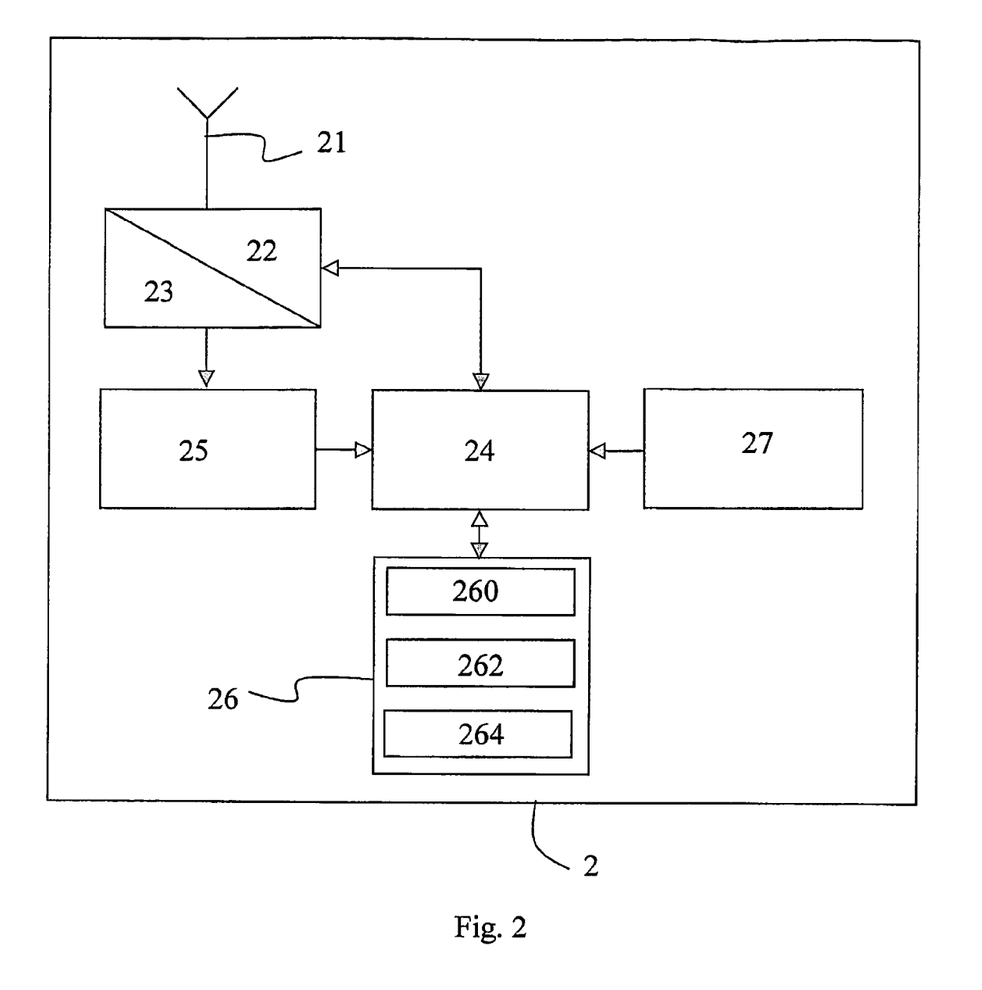
FIG. 2 is a block diagram of an electronic data collecting device.

As shown in FIG. 2, the electronic data collecting device 2 comprises an antenna 21, a radio transmitter 22, a radio receiver 23, a processor 24, a power source 25, a data storage module 26, and a system clock 27. The device may include other components but only those components material to the description are shown.

The radio transmitter/receiver 22, 23 operates as a low power, radio frequency (RF) wireless system.

Devices designed to be associated with an animal may have a variable transmission range for the transmitter, for instance in the order of one to twenty meters. Devices to be associated with a location (e.g. a farm, transport vehicle, livestock market, or abattoir) may be provided with a transmitter having a greater range, e.g. fifty to one hundred meters. A device for use in a reader may have a variable transmission range which may be selected according to the proposed task of the reader.

The processor 24 may be any suitable processor but preferably is a low power processor to minimize the power consumption of the device. The processor 24 may be any suitable processor but preferably is a low power processor to minimize the power consumption of the device.

The power source 25 may be any suitable source. For example, if the device is accessible to the open air, the power source may be an array of solar cells. Otherwise the power source is likely to be a long-life battery or a kinetic energy conversion device.

The data storage module 26 comprises non-volatile memory and stores a first unique identifier 260 electronically coded into the data storage module. This unique identifier is permanently associated with the device and hence the animal or article the device is attached to in some way. To prevent fraud or error, this part of the data storage module 26 is write-protected and may only be changed by authorized persons, e.g. the manufacturer or a government body.

The data storage module stores further unique identifiers, for instance as short term parameters 262 or long term parameters 264, as will be discussed below. Parameters stored as short term and long parameters will be considered to be complete store parameters and parameters stored as short term will be considered to be recent store parameters.

For a device 2 intended to be associated with an animal, it is envisaged that a compression algorithm will be used to manage the stored identifiers received from other devices. For instance, identifiers received within a first period (e.g. the last seven days) may be stored as a short term parameter 262 in the Recent Store and older identifiers may be stored, according to a compression algorithm, as long term parameters 264. A compression algorithm as described in WO02/076193 (which is hereby incorporated herein by reference in its entirety) may be used. For a device intended for purposes other than attaching to an animal, the memory may be larger as size is not so constrained.

Accordingly a first type of electronic data collecting device may be provided for an animal or a food item and is limited by its physical size, by its memory size, and by its energy source. This device is referred to herein as an Animal Product Device. Similarly a second type of electronic data collecting device may be provided for facilities such as a building, a vehicle, food processing equipment, feeding troughs, marker posts, and other similar items. This device is referred to herein as a Facility Device and may also include a Geographical Positioning System (GPS) and may be linked to an external power source. It is anticipated that the Facility Device will not be energy constrained and will possess more power, more memory, and a stronger signal than the Animal Product Device and will be able to transmit over a greater range.

For both devices, the processor is arranged to receive, by means of a radio receiver, a wakeup call at all times. The wakeup call includes the unique identifier belonging to another electronic data collecting device or to an electronic reader. All wakeup calls are evaluated by the processor, and information from the wakeup call is either stored in the memory or discarded. A procedure for determining whether a wakeup call is stored or discarded is described further below. Preferably the date and/or time at which the wakeup call was received is also stored, together with the unique identifier of the transmitting device, and the date/time representing information on when the contact was made.

For both devices, the processor 24 is also arranged to transmit its First Unique Identifier by means of the radio transmitter 22. To conserve energy, the radio transmitter 22 is normally in "deep sleep" and is switched on after the processor has received a wakeup call according to a pre-determined time interval, or a wakeup call triggered by a transmission from another electronic data collecting device, or a wakeup call from an electronic reader. An example of the process by which the Animal Product Device and the Facility Device transmit their First Unique Identifier in response to a wakeup call is described further below. When transmitting, the Animal Product Device and the Facility Device merely transmit their own First Unique Identifier. They do not establish a communication link with other electronic data collecting devices.

A record of contacts is therefore collected and maintained for individual animals and for individual food products. A record of the contacts that an individual animal has made with other animals of the same or of a different species or with individual food items is made available, as is a record of contacts made by an individual food item with other food items of the same or of a different type or with an animal.

Both the Animal Product Device and the Facility Device are designed to respond to a wakeup call from an electronic reader and to a request from the said reader to download their records to the reader. To download records from an Animal Product Device and/or a Facility device, the reader establishes a communication link with the electronic data collecting device. This process is described further below. The principal function of the reader is to gather the identities stored in Animal Product Devices and Facility Devices. The reader is therefore able to send a wakeup call to the devices to establish a direct link with the devices and to communicate with a standard PC or other similar item, so that the information from the devices can be processed.

Figure 3:
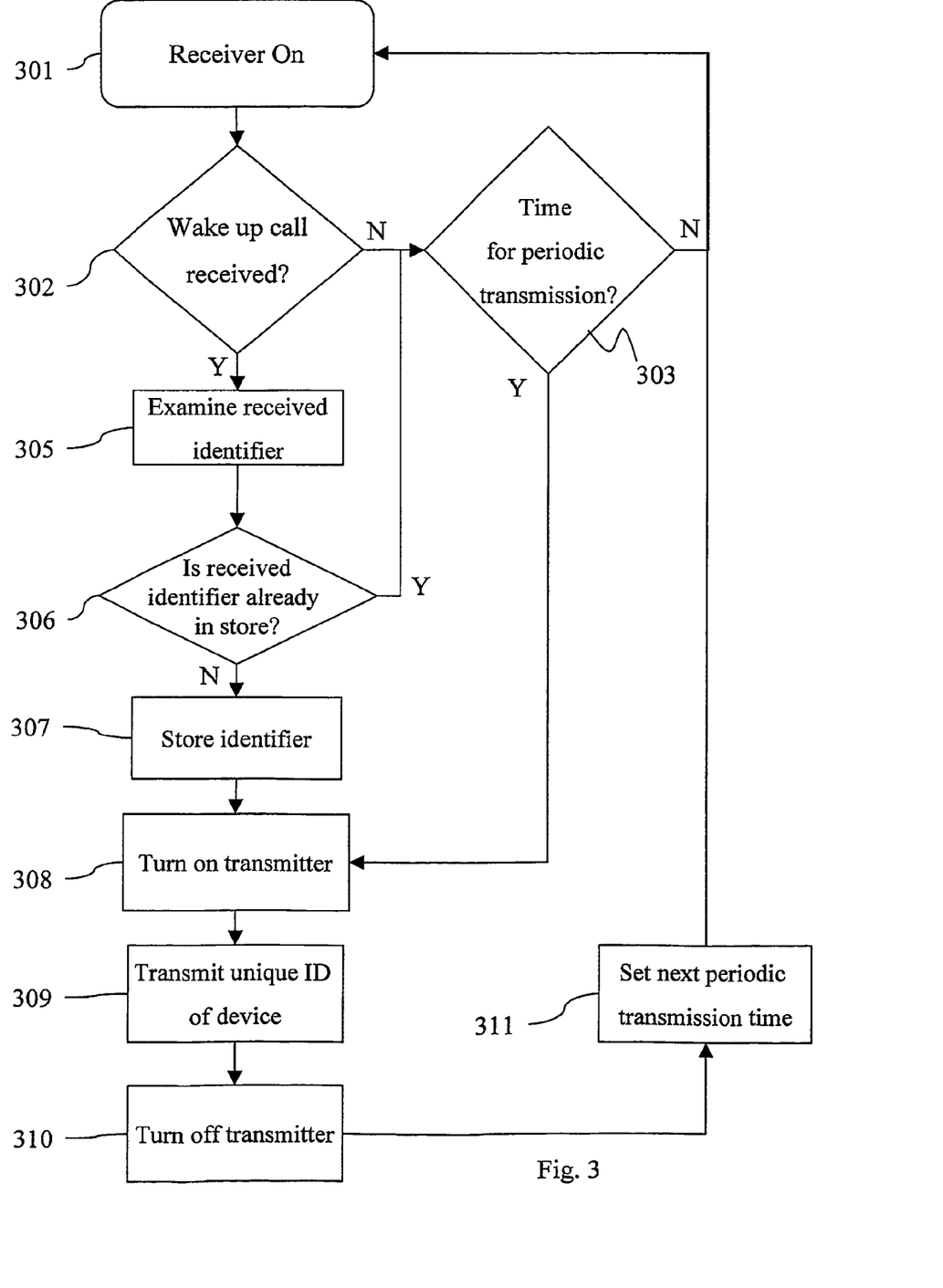
FIG. 3 is a flow diagram illustrating one embodiment of an enquiry operation of the electronic data collecting device.

FIG. 3 illustrates the operation of an embodiment of an electronic data collecting device 2 (shown in FIG. 2). In such a device 2, the default operating condition of the device is for the receiver to be in a receive condition, i.e. the receiver 23 (shown in FIG. 2) is predominantly in a switched on state. With the receiver 23 on (301), the receiver monitors (302) for receipt of a wakeup call or an interrupt from a timer. If no wakeup call is received, the device 2 checks (303) whether it is time to periodically turn on the transmitter and, if not, reverts to monitoring for a wakeup call (302). The process of checking the time to perform an action may be automated using interrupt timers.

When a wakeup call is received the device examines (305) any unique identifiers included in the wakeup call. The device 2 then checks (306) whether the received identifier is already stored in its data storage module 26 (shown in FIG. 2). If the received identifier is not already stored in the data storage module 26, the received identifier is stored in the data storage module 26 (307) and the processor 24 turns on (308) the radio transmitter 22 and transmits (309) its own unique identifier.

If the received identifier is already stored in the data storage module 26, the device 2 checks (303) whether it is time to periodically turn on the radio transmitter 22. If so, the processor turns on (308) the radio transmitter 22 and transmits (309) its own unique identifier. If not, the device 2 returns to a listening state with the radio receiver 23 in a receive condition.

Thus, the radio transmitter 22 is normally asleep and is only woken up (308) in response to the wakeup call (if the received identifier is not already stored in the data storage module 26) or when it is time for a periodic transmission. The device 2 then transmits (309) its own unique identifier. Once this is completed the radio transmitter 22 is turned off (310) and the device 2 returns to a state in which the radio receiver 23 is on and the radio transmitter 22 is asleep.

The period between periodic transmission may be fixed or variable. In the latter case, the device 2 may also calculate a new period after each transmission of its own identifier. Thus after turning off the radio transmitter 22, the processor 24 calculates (311) a new time until the next transmission. Although this is shown in FIG. 3 as occurring after the radio transmitter 22 has been switched off, it will be clear to a person skilled in the art that this calculation may be carried out at an earlier point in the cycle.

Figure 4:
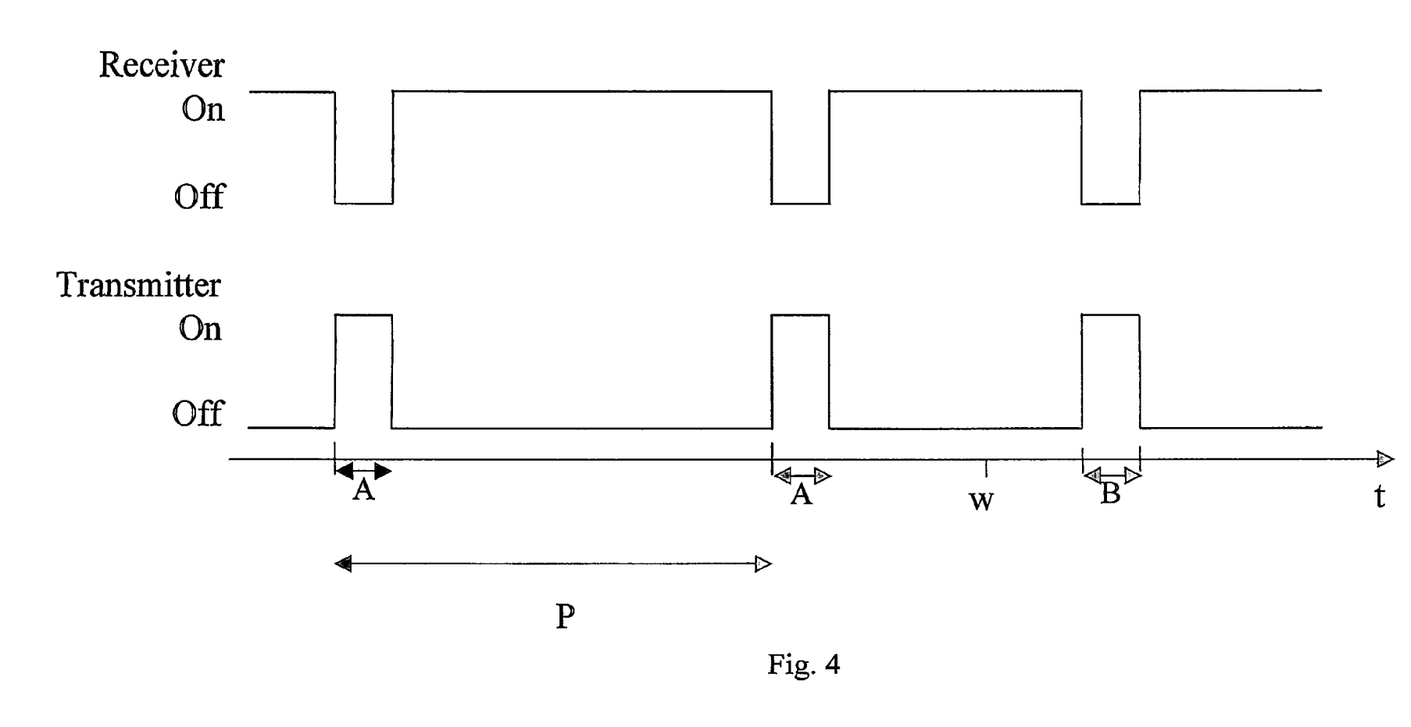
FIG. 4 is a timing diagram illustrating an example of the operation of the receiver and transmitter of the electronic data collecting device.

FIG. 4 is a timing diagram illustrating an example of the operation of the radio receiver 23 and the radio transmitter 22 of the electronic data collecting device 2. The upper time line in FIG. 4 shows the on/off status of the radio receiver 23 and the lower time line shows the on/off status of the radio transmitter 22. As can be seen, the normal operating state of the device 2 is for the radio receiver 23 to be on, i.e. in a receive condition. Periodically, the radio transmitter 22 is turned on for a periodic transmission; this is indicated in FIG. 4 as occurring periodically for a time period A. During a transmission period, the radio receiver 23 may be switched off, or it may enter a standby mode, or it may remain on. The time period between periodic transmissions is indicated by the reference letter P. This time period P may be fixed or variable. Once the periodic transmission has occurred, the radio transmitter 22 is switched off and the device 2 returns to the default condition with the radio receiver 23 in a receive condition.

Consider the instance of when a wakeup call is received (for instance at time W in FIG. 4). In response to the wakeup call, the transmitter 22 is switched on, as described earlier with reference to FIG. 3, and the receiver may enter a new mode. This is indicated in FIG. 4 as period B of the transmitter. Once the transmission has occurred, the radio transmitter 22 is switched off and the device 2 returns to the default condition with the radio receiver 23 in a receive condition.

Thus an electronic data collecting device 2 as described has a radio receiver 23 that is on for most or all of the time. The radio transmitter 22 of the device 2 is turned on in response to a wakeup call or at periodic intervals. During the periods when the radio transmitter 22 is on, the identifier of the device 2 is broadcast for receipt by any similar devices 2 in range. The message transmitted by the device 2 thus may act as a wakeup call for other devices 2 of a similar type.

The timing of the periodic transmissions of a device 2 may be determined in many ways. In one preferred implementation, the period is a function of the time since an identifier was last added to the store of the device 2. For instance, the longer the time between additions to the store, the longer the period of the periodic transmissions may be. Thus the duration of the time interval between periodic transmissions will increase if no new identities have been added to the device 2 within a particular time period. This may occur for instance when a sheep stays on its home farm within a flock for a long period of time. This is described further below.

The operation of a device 2 for gathering data and for use with an animal, location, etc. (referred herein as a Animal Product Device or Facility Device Reader) will now be described using CSP notation, as will the operation of a device 2 for reading the gathered data (this latter device will be referred to as a reader). The term Collector as used herein refers to a Animal Product Device or to a Facility device.

In the following description, N, N1, etc. denote the identity of the devices 2. The variables n, n1, etc. describe the identity of any other device 2 in the vicinity. μX[N] is a piece of CSP syntax which in this context is used to mean "the unique process X[N]" where X[N] is a recursive process described in terms of the events and sub-processes defined in Table 1 below. It is therefore possible to list the possible sequences of events that may be traced by the process X[N] so described.

For example, Traces [A] are the set of sequences of events that may be generated by a process A.

Two processes A and B may be shown to be different by the generation of a valid trace segment of the process A that cannot possibly be generated by the process B. Two processes A and B that generate the same set of traces (that is Traces [A]=Traces [B]) are necessarily identical.

TABLE 1

Events occurring in the Process Specification

| Event or Sub-Process | Description of the Event or Sub-Process |
|---|---|
| Receive[n] | Term used to describe the event whereby a Animal Product Device or a Facility Device identifies that it has received a wakeup call and a Unique Identifier from another collecting device [n] making the transmission. To safeguard against fraud, the signal strength of the wakeup call will also be recorded using a flag that indicates whether the signal exceeds a given strength. If two devices were co-located on or in the same animal or food product, the transmission received would exceed the expected strength by a significant amount. By examining the store, these offending devices could be monitored. |
| Transmit[N] | Term used to describe the event whereby an Animal Product Device [N] or a Facility Device [N] broadcasts its First Unique Identifier. This event occurs in response to a Receive[n] event or a TimeToTransmit[N] event. The Transmit[N] event always includes a wakeup call. Note that each Device [N] can only broadcast its own First Unique Identifier, it does not broadcast the identities of any other devices [n] that it has stored. When the Transmit[N] event is in response to a Receive [n] event, the device waits for a random period of between 0 and MaxWait seconds. The duration of MaxWait is to be determined from consideration of the system. The Transmit[N] event is an energy expensive operation and the system restricts the number of times that the transmitter in the Animal Product Device is turned on. Thus the Animal Product Device transmits infrequently, say once every 5 minutes, and the Facility Device transmits frequently, say once every second, and uses a stronger signal than the Animal Product Device. |
| TimeToTransmit[N] | The TimeToTransmit[N] event is a function of the system clock and small variations in the frequency will cause different data collecting devices to actually fire at |

TABLE 1-continued

Events occurring in the Process Specification

| Event or Sub-Process | Description of the Event or Sub-Process |
|---|---|
| | different times. This is the randomization procedure used in Bluetooth. |
| WhatIsInRecentStore[n] | Event that occurs when a Reader is interrogating a Animal Product Device [n] or a Facility Device [n] concerning the contents of the recent store (262). |
| WhatIsInStore[n] | Event that occurs when a Reader is interrogating a Animal Product Device [n] or a Facility Device [n] concerning the contents of the complete store (262 and 264). |
| ReadOutRecentStore[N] | Term used to describe the event whereby a Animal Product Device [N] or Facility Device[N] transmits the contents of its Recent Store (262) to a Reader. The devices only transmit the data in their own stores. |
| ReadOutStore[N] | Term used to describe the event whereby a Animal Product Device [N] or Facility Device[N] transmits the contents of its Complete Store (262, 264) to a Reader. |
| PutInStore[n] | This event is an abstraction of the process involved in storing the data. The Store may be organized in the form of several databases and the data collecting devices may use a two step process whereby, for example, the devices store data temporarily in a short-term memory before moving these data or a selection of the data into a more permanent place. |
| NotInStore[n] | This event may occur after just a small search or after a more global search of the Store is made. The size of the search process will be decided after consultation with the customer. |
| FoundInStore[n] | This event occurs if NotInStore[n] does not occur. |
| SetNextTransmission Time [N] | Term used to describe the event whereby an Animal Product Device[N] or a Facility Device[N] calculates the duration of the time interval, Pt, between the current transmission and the next periodic transmission and sets the actual time at which the next periodic transmission will take place. The value of Pt varies during the operational life of the device and is a function of the previous value of Pt and |

TABLE 1-continued

Events occurring in the Process Specification

| Event or Sub-Process | Description of the Event or Sub-Process |
|---|---|
| | of the time that the last unique second identifier was received by the device. |
| ReaderIdentityRequest[R] | Term used to describe the event whereby a Reader [R] transmits its First Unique Identifier and a request for all Animal Product Devices[n] and Facility Devices[n] to transmit their First Unique Identifiers [n] to Reader [R] |
| ResponseReceive[0] (sub-process) | Term used to describe the sub-process whereby a Reader [R] enters a state in the process where it is waiting for responses from devices[n] following the transmission of a ReaderIdentityRequest [R] from Reader [R]. |
| ResponsesReceived[n] (sub-process) | Term used to describe the sub-process whereby a Reader [R] enters a state in the process where it receives the First Unique Identifiers of n devices and stores them in its memory store and is awaiting the n + 1 response. |
| TimeInterval[Max] | Term used to describe the event whereby Reader [R] fails to receive the specified maximum number of First Unique Identifiers from surrounding devices [n] within a specified time interval Max. It may be possible for the user to vary the value of Max according to the field circumstance. |
| ResponsesProcessed[n] (sub-process) | Term used to describe the sub-process whereby a Reader [R] enters a state in the process where it initiates the processing of the First Unique Identifiers received from n devices during the sub-processes ResponsesReceived[0] . . . ResponsesReceived[n]. |
| ResponsesReceived [Max] (sub-process) | Term used to describe the sub-process whereby a Reader [R] enters a state in the process where it has received a default maximum number of first unique identifiers from devices [n]. The Reader [R} then either returns to its initial state X[R] or proceeds to event ResponsesProcessed[N]. |
| OutputDevices[N] | Term used to describe the event whereby Reader[R] produces a list of all the first unique identifiers that it has received from Animal Product Devices[n] or Facility Devices[n] during the sub-processes ResponseReceived[0] . . . ResponsesReceived[n]. The Reader[R] may also highlight |

TABLE 1-continued

Events occurring in the Process Specification

| Event or Sub-Process | Description of the Event or Sub-Process |
|---|---|
|  | the unique identifiers of those devices that are new to its RecentStore. |

The Device Process

```
Collector [N]= μX[N].(
  (1) Receive [n] →
      (NotInStore[n] → PutInStore[n] → Transmit[N] →
          SetNextTransmissionTime[N] |
      FoundInStore[n] → X[N] )        |
  2) TimeToTransmit[N] → Transmit[N] →
      SetNextTransmissionTime[N] → X[N]     |
  3) ReaderIdentityRequest[R] → Transmit[N] →
      SetNextTransmissionTime[N] →
      (NotInStore[n] → PutInStore[n] → X[N]    |
      FoundInStore[n] → X[N] )               |
  4) WhatIsInRecentStore[n] →
      (X[N]          |
      ReadOutRecentStore[N] → X[N] )  |
  5) WhatIsInStore[n] →
      (X[N]          |
      ReadOutStore[N] → X[N] )         )
```

The operation of a collector (where Collector [N] is either an Animal Product Device [N] or Facility Device [N]) can be split into five main sub-processes marked 1, 2, 3, 4, 5 in the CSP process description language above. The first sub-process (1) occurs when the collector has received a transmission from another collector. The second sub-process (2) occurs when the collector itself decides that the time has come for it to broadcast its identity. The third sub-process (3) occurs when the collector receives an identity request from a reader. The fourth sub-process (4) occurs when a reader transmits a request for a particular collector to read the contents of its recent store. This sub-process (4) is designed so that only the collector that is addressed responds. The fifth sub-process (5) is very similar to the fourth sub-process and is the response of the collector when it receives a request from a reader to read the contents of all the memory.

Sub-process 1: sets out the process whereby the Collector [N] receives a transmission from the device [n] and the Collector [N] then broadcasts its First Unique Identifier and stores a second unique identifier received from the device [n].

The event Receive[n] occurs when the Collector[N] receives a transmission[n] from a device[n] which is nearby.

On receiving transmission[n], the Collector [N] checks its RecentStore[N] to see if it contains the unique identifier for the device[n]. This checking process triggers one of two scenarios.

In the first scenario, the event NotInStore[n] occurs if the unique identifier of device[n] is not present in RecentStore [N]. If event NotInStore[n] is true, the Collector [N] then proceeds to the event PutInStore[n] and then proceeds to the event Transmit[N] whereby the processor[N] of the Collector [N] switches on Transmitter[N] which broadcasts the First Unique Identifier[N] of the Collector [N]. On completing event Transmit[N] the Collector [N] proceeds to the event SetNextTransmissionTime[N] which is described in the Sub-process 2 below. On completing event SetNextTransmission-Time[N], the Collector[N] returns to the listening state X[N].

In the second scenario, the event FoundInStore[n] is True and the Collector [N] returns to the listening state X[N] without sending a transmission.

Sub-process 2: sets out the process whereby the Collector [N] sends out a transmission[N] because a time Pt has elapsed since its last transmission without the Sub-process 1 occurring. Following the transmission, a new Pt is calculated and used when the next transmission time is set.

A periodic transmission occurs when the event Time-ToTransmit[N] is triggered. During this event, the processor [N] of the Collector [N] switches on the Transmitter[N] and initiates the event Transmit[N]. On completing the Transmit [N], the Collector [N] proceeds to the event SetNextTransmissionTime[N].

The event SetNextTransmissionTime[N] specifies the time interval Pt between each periodic transmission and the time at which the next periodic transmission will occur. A default value for Pt is specified during the manufacture of each collector [n]. The value of Pt can vary during the operational life of each collector [n] and preferably is a function of the last identifier Id_st received and stored by the Collector [N]. An exemplary function for Pt is given below:

Let MaxPt=7200 sec
and MinPt=10 sec
and the default value for Pt=600 sec

If the last Id_st is not in the RecentStore[N] and the current value of Pt is greater than 2MinPt, then set the new Pt value to the old Pt value divided by 2.

If the last Id_st is not in the RecentStore[N] and the current value of Pt is less than 2MinPt, then set the new Pt value to the old Pt value.

If the last Id_st is already in the RecentStore[N] and the current value of Pt is less than MaxPt/2, then set the new Pt value to the old Pt value multiplied by 2.

If the last Id_st is already in the RecentStore[N] and the current value of Pt is greater than or equal to MaxPt/2, then set the new Pt value to the old Pt value.

Once the time interval Pt before the next transmission period has been calculated, the actual time for the next Time-ToTransmit[N] event is set to the last transmission time+Pt.

Sub-process 3: sets out the process whereby the Collector [N] receives a transmission from the Reader [R] and the Collector [N] then broadcasts its First Unique Identifier and stores a second unique identifier received from the Reader [R].

The event ReaderIdentityRequest[R] occurs when the Collector [N] receives a wake-up call[r] from a Reader [r] which is nearby.

On receiving a wake-up call[r], the Collector [N] switches on its Transmitter[N] and initiates an event Transmit[N]. On completing the event Transmit[N], the Collector [N] proceeds to event SetNextTransmissionTime[N] which is described in Sub-process 2 above. Completion of event SetNextTransmissionTime[N] then triggers one of two scenarios.

In the first scenario, the Event NotInStore[n] occurs if the unique identifier of the Reader [R] is not present in Recent Store[N]. If event NotInStore[n] is true, the Collector [N] proceeds to the event PutInStore[n], and then returns to the listening state X[N].

In the second scenario, the event FoundInStore[n] is True and the Collector [N] returns to the listening state X[N] without storing the unique identifier of the Reader [R] in its RecentStore 262.

Sub-process 4: sets out the process whereby the Collector [N] receives a transmission from a Reader [R] concerning its RecentStore[N].

On receiving a request from the Reader [R] to read what is in its recent store, the event WhatIsInRecentStore[n] occurs. The Collector [N] examines the transmission from the Reader [R] to see if this contains its First Unique Identifier[N]. If the First Unique Identifier[N] is not present, then the Collector [N] remains in the Listening State X[N]. If the First Unique Identifier[N] is present, then the event ReadOutRecentStore [N] occurs whereby the Collector [N] switches on its transmitter[N] and transmits the contents of its RecentStore[N] 262 to the Reader [R]. The Collector [N] then returns to its listening state X[N].

Sub-process 5: sets out the process whereby the Collector [N] receives a transmission from a Reader [R] concerning its CompleteStore[N] (262 and 264).

On receiving a request from the Reader [R] to read what is in its complete store, the event WhatIsInStore[n] occurs. The Collector [N] examines the transmission from the Reader [R] to see if this contains its First Unique Identifier[N]. If the First Unique Identifier[N] is not present then the Collector [N] remains in the Listening State X[N]. If the First Unique Identifier[N] is present then the event ReadOutStore[N] occurs whereby the Collector [N] switches on its transmitter [N] and transmits the contents of its CompleteStore[N] (i.e. 262 and 264) to the Reader [R]. The Collector[N] then returns to its listening state X[N].

A Collector [N] thus operates in a dual mode whereby it responds to non-specific transmissions from other devices[n] and readers[r] within its transmission range (events Receive [n] and ReaderIdentityRequest[R]), or it responds to a specific request from a Reader [R] to download the contents of its RecentStore[N] or CompleteStore[N] (events WhatIsInRecentStore [N] and WhatIsInStore[N]).

The way a reader operates will depend on the circumstances. It may first collect the identities of the devices near by and then individually request a service from a particular device asking the device to read out the contents of the memory in either its Recent Store or its Complete Store.

The Reader Process

---

Reader[R]= μX[R].(
    (1) ReaderIdentityRequest[R] → ResponsesReceived[0]
                              |
    (2) WhatIsInRecentStore [N] →
        ReadOutRecentStore[N] → X[R]    |
    (3) WhatIsInStore[N] →
        ReadOutStore[N] → X[R]))
where
ResponsesReceived[n] =μX.(Receive[n1] →
    ResponsesReceived [n+1] |
        TimeInterval[Max] →
        (ResponsesProcessed[n]        |
        X[R])))
and where
ResponsesReceived[Max] =μX Receive[nMax] →
        (X[R]    |
        ResponseProcessed[Max]))
ResponsesProcessed[n]= μX (OutputDevices[n] →X[R])

---

The reader process can be split into three main sub-processes marked 1, 2, 3 in the CSP process description language of the Reader Process above. The first sub-process (1) occurs when a Reader [R] transmits a reader identity request to all devices within its transmission range. The second sub-process (2) occurs when a Reader [R] requests a particular device [N] to read out the contents of its RecentStore[N]. The third sub-process (3) occurs when a Reader [R] requests a particular device [N] to read out the contents of its CompleteStore [N].

Reader Sub-process 1: sets out the process whereby the Reader [R] requests and receives the identities of all the devices within its transmission range.

The process is initiated by an event ReaderIdentityRequest [R] whereby the Reader [R] transmits its First Unique Identifier and a request for all devices within its transmission range to transmit their First Unique Identifiers. The Reader [R] then starts the sub-process ResponsesReceived[0] where it waits for responses from surrounding devices.

The event Receive[n1] occurs when the Reader [R] receives a response from a device. The Reader [R] then starts the subprocess ResponsesReceived[1] whereby it updates its Store[R] with the unique identifier of the device[n]. This process of receiving and storing the first unique identifiers of surrounding devices is continued until subprocess ResponsesReceived[Max] is started.

If no responses are received within a default maximum time interval, the event TimeInterval[Max] is triggered and the Reader [R] then enters the subprocess ResponsesProcessed[n], or it returns to its initial state X[R].

Subprocesses ResponsesReceived[Max] commences when the Reader [R] has received a pre-defined maximum number of first unique identifiers from n devices. On completing this subprocess, the Reader [R] either returns to its initial state X[N], or it proceeds to subprocess ResponsesProcessed[N].

In the subprocess ResponsesProcessed[n], the Reader [R] processes all of the First Unique Identifiers it has received from n devices during subprocess ResponsesReceived[n]. This is followed by event OutputDevices[N] whereby the Reader [R] produces a list of all the first unique identifiers that it has processed, for the reader user. This list may also highlight the identifiers of those devices that are new to its RecentStore[R]. The Reader [R] then returns to its initial state X[N].

Reader Sub-process 2: sets out the process whereby the Reader [R] transmits a request to a specific Device [N] asking it to download the contents of its RecentStore[N] to the Reader [R].

The process is initiated by event WhatIsInRecentStore[N] whereby the Reader [R] transmits a wake-up call to the Device [N]. The wake-up call includes the First Unique Identifier of the Device [N], the First Unique Identifier of the Reader [R] and a signal requesting the Device [N] to download its RecentStore[N] to the Reader [R]. This event is then followed by the event ReadOutRecentStore[N] whereby the Device [N] reads out its RecentStore[N] to the Reader [R]. Following this event the Reader [R] returns to its initial state X[R].

Reader Sub-process 3: sets out the process whereby the Reader [R] transmits a request to a specific Device [N] asking it to download the contents of its CompleteStore[N] to the Reader [R].

The process is initiated by the event WhatIsInStore[N] whereby the Reader [R] transmits a wake-up call to the Device [N]. The wake-up call includes the First Unique Identifier of the Device [N], the First Unique Identifier of the Reader [R] and a signal requesting the Device [N] to download its CompleteStore [N] to the Reader [R]. This event is then followed by the event ReadOutStore [N], whereby the Device [N] reads out its RecentStore[N] to the Reader [R]. Following this event the Reader [R] returns to its initial state X[R].

Readers[r] thus operate in a dual mode whereby a Reader [R] can transmit a non-specific request (the event ReaderIdentityRequest[R]) to all devices within its transmission range or a Reader [R] can transmit a specific request (the events WhatIsInRecentStore[N] and WhatIsInStore[N]) to a specific Device [N] within its transmission range.

In a further embodiment of an electronic data collecting device 2, the device 2 is arranged such that the default operating condition is for the radio transmitter 22 to be switched off and for the radio receiver 23 to remain in the receive condition for a period α seconds, and then, if no transmission is detected, to switch itself off for an interval β seconds, and then switch on again for a seconds. This sequence of receiver on, receiver off, receiver on, continues throughout the operational life of the device 2. On receiving a transmission from a second device 2, the sequence is suspended and the receiver 23 remains in the receive condition until receipt of the transmission is completed. A transmission includes a standard signal such as an unmodulated carrier and the First Unique Identifier of the device 2. A transmission lasts a minimum length δt, whereby the transmission of the unmodulated carrier is a minimum of α+β seconds. The use of a minimum period of α+β seconds for the unmodulated carrier ensures that the receivers of other collecting devices [n] will receive the First Unique Identifier of the device [N] in full. On receipt of a wakeup call [n] and storage of a Second Unique Identifier [n] by the device [N], the processor[N] of a device [N] is arranged to place the radio transmitter[N] into a transmit condition and the receiver[N] is switched off for the duration of the transmission. On completion of the transmission, the receiver[N] resumes the on/off sequence described above.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. An animal electronic data collecting device comprising:
   a radio transmitter;
   a radio receiver;
   memory for storing information including a first identifier associated with said device; and
   a processor for controlling the operation of said device, wherein said processor is arranged to transmit a signal, by means of said radio transmitter, and to receive, by means of said radio receiver, one or more signals, each representing a second identifier from other devices, said processor being arranged to store in said memory each second identifier;
   wherein the default operating condition of said device is for said radio receiver to be in a receive condition and, upon receipt of a wakeup call, said processor is arranged to place said radio transmitter into a transmit condition; and
   wherein said processor is further arranged to periodically place said radio transmitter into a transmit condition to cause said radio transmitter to transmit said first identifier.

2. A device as defined in claim 1, wherein said time interval between periodic transmission is a function of the time since the last receipt of a second identifier.

3. A device as defined in claim 1, wherein, upon receipt of a wakeup call, said processor is arranged to place said radio transmitter into a transmit condition when said wakeup call includes a second identifier that is not already stored in said memory of said device.

4. A device as defined in claim 1, wherein said device is further arranged to send data from said memory to a remote device in response to a specific request from said remote device.

5. A device as defined in claim 1, wherein said device is arranged to store a received second identifier in a first part of said memory and to store said received identifier in a second part of said memory at a time determined by the time elapsed since the receipt of said second identifier.

6. A device as defined in claim 5, wherein said device is further arranged to send data from said first and/or second parts of said memory to a remote device in response to a specific request from said remote device.

7. A method of gathering data on animals and/or animal products, said method comprising;
   receiving at a device one or more signals, each representing a second identifier from other devices;
   storing in memory a received second identifier; and
   transmitting a signal from said device including a first identifier associated with said device;
   periodically placing said radio transmitter into a transmit condition to transmit said first identifier,
   wherein the default operating condition of said device is for said device to be in a condition to receive signals and, on receipt of a wakeup call, said device is placed into a condition to transmit signals.

8. A method as defined in claim 7, wherein the time interval between periodic transmission is a function of the time since the last receipt of a second identifier.

9. A method as defined in claim 7, wherein, upon receipt of a wakeup call, said device is placed into a condition to transmit signals when said wakeup call includes a second identifier that is not already stored in said memory of said device.

10. A method as defined in claim 7, further comprising:
    sending data from said memory to a remote device in response to a specific request from said remote device.

11. A method as claimed in defined in claim 7, further comprising:
    storing a received second identifier in a first part of said memory and storing said received identifier in a second part of said memory at a time determined by the time elapsed since the receipt of said second identifier.

12. A method as defined in claim 11, further comprising:
    sending data from said first and/or second parts of said memory to a remote device in response to a specific request from said remote device.

13. An animal electronic data collecting device comprising:
    a radio transmitter;
    a radio receiver;
    memory for storing information including a unique first identifier associated with said device; and
    a processor operatively connected to said radio transmitter to cause the transmission of radio signals therefrom, said processor also being operatively connected to said radio receiver to obtain radio signals from any other device which are received by said radio receiver, said radio signals received from each said other device representing a unique second identifier from each said other device, said processor being operatively connected to said memory to store in said memory each unique second identifier received from said at least one other device;

wherein said processor will, upon the occurrence of a wakeup signal, cause said radio transmitter to transmit radio signals from said device representing said unique first identifier from said device; and wherein said wakeup signal is generated periodically by said processor to cause said radio transmitter to periodically transmit radio signals from said device representing said unique first identifier from said device.

14. A device as defined in claim 13, wherein said wakeup signal is also generated by said processor following the receipt of radio signals from any other device which are received by said radio receiver.

15. A device as defined in claim 14, wherein said wakeup signal is only generated by said processor following the receipt of radio signals from any other device which are received by said radio receiver if the unique second identifier received from said at other device has not previously been stored in said memory.

16. A device as defined in claim 13, wherein the time interval between periodic generation of said wakeup signal and periodic transmission of radio signals from said device is a function of the time since the last receipt of a unique second identifier from another device.

17. A device as defined in claim 13, wherein said processor is further arranged to send any unique second identifiers received from said other devices from said memory of said device to a remote device in response to a request from said remote device.

* * * * *

UNITED STATES PATENT AND TRADEMARK OFFICE
CERTIFICATE OF CORRECTION

PATENT NO. : 7,610,879 B2
APPLICATION NO. : 10/522637
DATED : November 3, 2009
INVENTOR(S) : Gardner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 956 days.

Signed and Sealed this

Twelfth Day of October, 2010

David J. Kappos
*Director of the United States Patent and Trademark Office*